United States Patent
Akbay

(10) Patent No.: US 10,348,880 B2
(45) Date of Patent: Jul. 9, 2019

(54) SYSTEM AND METHOD FOR GENERATING AUDIO DATA

(71) Applicant: Umut Gokmen Akbay, Charlotte, NC (US)

(72) Inventor: Umut Gokmen Akbay, Charlotte, NC (US)

(73) Assignee: Cheerful Ventures LLC, Charlotte, NC (US)

( * ) Notice: Subject to any disclaimer, the term of this patent is extended or adjusted under 35 U.S.C. 154(b) by 3 days.

(21) Appl. No.: 15/872,757

(22) Filed: Jan. 16, 2018

(65) Prior Publication Data

US 2019/0007542 A1 Jan. 3, 2019

Related U.S. Application Data

(60) Provisional application No. 62/526,684, filed on Jun. 29, 2017.

(51) Int. Cl.
| | | |
|---|---|---|
| *H04M 1/72* | (2006.01) | |
| *H04M 1/725* | (2006.01) | |
| *G06F 3/16* | (2006.01) | |
| *G06F 16/60* | (2019.01) | |
| *G06F 16/638* | (2019.01) | |

(52) U.S. Cl.
CPC .......... *H04M 1/7255* (2013.01); *G06F 3/162* (2013.01); *G06F 3/165* (2013.01); *G06F 16/60* (2019.01); *G06F 16/638* (2019.01)

(58) Field of Classification Search
CPC ..... H04M 1/7255; G06F 16/60; G06F 16/638
See application file for complete search history.

(56) References Cited

U.S. PATENT DOCUMENTS

| | | | |
|---|---|---|---|
| 7,263,332 B1 * | 8/2007 | Nelson ................... | H04B 1/034 381/86 |
| 2014/0301573 A1 * | 10/2014 | Kiely ................... | G11B 27/031 381/119 |
| 2017/0094438 A1 * | 3/2017 | Chon ..................... | H04S 5/005 |

* cited by examiner

*Primary Examiner* — Wei Zhao
(74) *Attorney, Agent, or Firm* — Moore & Van Allen PLLC; Seongun M. Hong

(57) ABSTRACT

The invention provides a novel way to generate audio data files with embedded messages. In particular, the system generates a plurality of permutations of audio input data provided by a user. The system then modifies the permutations of the audio input in various manners as described herein. As a result, the system is able to generate an audio file which includes a much greater number of embedded messages than audio files generated by traditional systems.

18 Claims, 4 Drawing Sheets

001

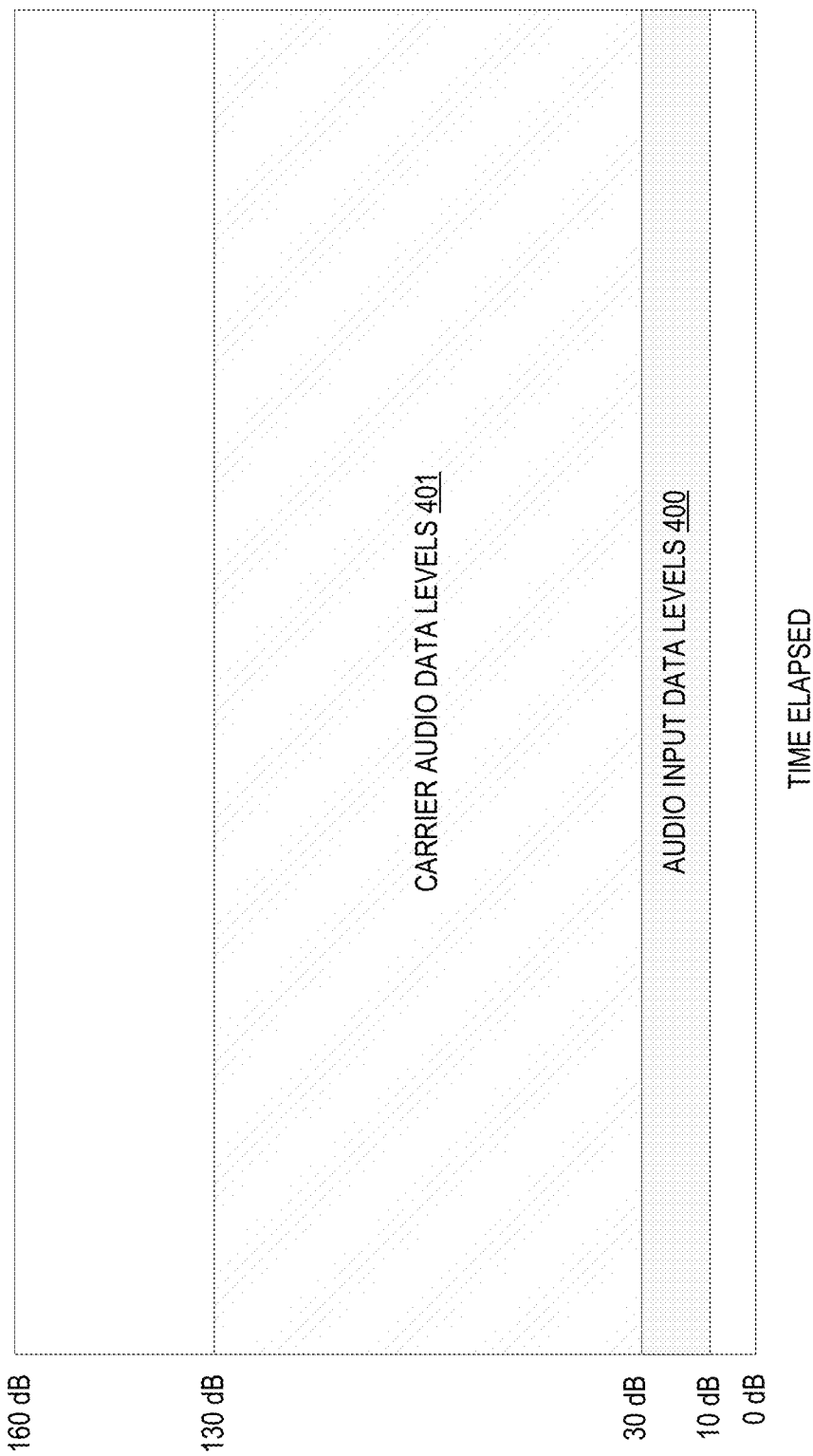

SYSTEM AND METHOD FOR GENERATING AUDIO DATA

PRIORITY CLAIM

This application claims priority to U.S. Provisional Application Ser. No. 62/526,684, entitled "SYSTEM AND METHOD FOR GENERATING AUDIO DATA", filed Jun. 29, 2017, which is incorporated herein by reference in its entirety.

FIELD OF THE INVENTION

The present invention embraces a system, computer program product, and method for generating audio data files with embedded messages.

BACKGROUND

In traditional methods of creating audio with embedded messages, the embedded messages are typically played back at native frequencies and speeds, which limits the number of embedded messages that is present in a given audio recording. Accordingly, there is a need for a more efficient and effective way to generate audio data containing embedded messages on a "per time" and/or a "per file size" basis.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention provides a novel way to generate audio data files with embedded messages. In particular, the system generates a plurality of permutations of audio input data provided by a user. The system then modifies the permutations of the audio input in various manners as described herein. As a result, the system is able to generate an audio file which includes a much greater number of embedded messages compared to audio files generated by traditional systems.

Embodiments of the present invention provide a system, computer program product, and a method for generating audio data files. The invention may comprise receiving one or more audio input files from a user device; receiving a selection of a carrier audio file from the user device; generating one or more copies of the one or more audio input files; modifying the one or more copies of the one or more audio input files to generate one or more embedded messages; generating an audio output file, the audio output file comprising the carrier audio file and the one or more embedded messages; and transferring the audio output file to the user device.

In some embodiments, the invention further comprises detecting a base sound intensity level of the carrier audio file; and reducing sound intensity levels of the one or more copies of the one or more audio input files based on the base sound intensity level.

In some embodiments, the base sound intensity level is between 30 dB and 100 dB, wherein the sound intensity levels of the one or more copies of the one or more audio input files are between 0 dB and 30 dB.

In some embodiments, modifying the one or more copies of the one or more audio input files comprises reducing a frequency of a first copy of the one or more audio input files; and increasing a frequency of a second copy of the one or more audio input files.

In some embodiments, the frequency of the first copy of the one or more audio input files and the frequency of the second copy of the one or more audio input files are between 20 Hz and 20 kHz.

In some embodiments, modifying the one or more copies of the one or more audio input files comprises reducing a playback speed of a first copy of the one or more audio input files; and increasing a playback speed of a second copy of the one or more audio input files.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
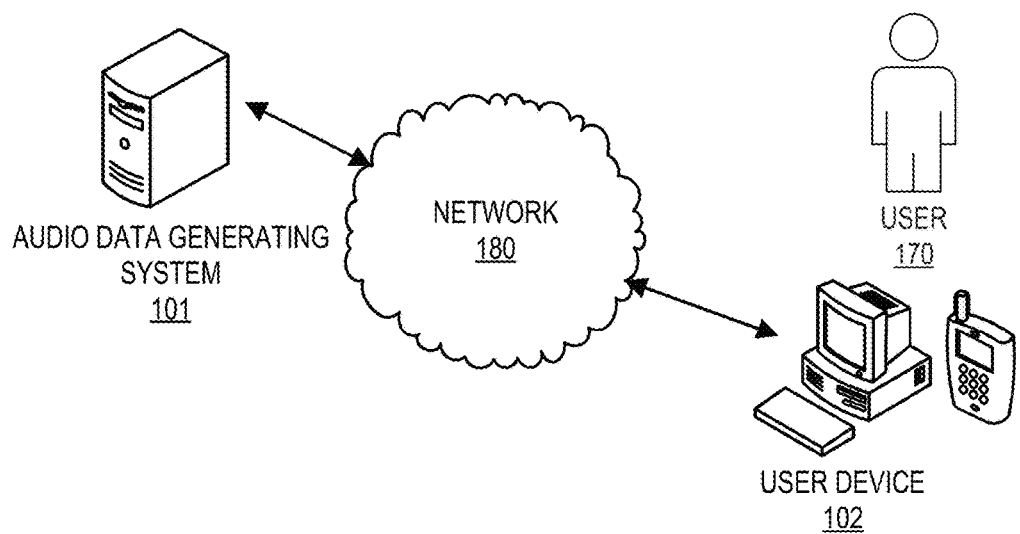
Figure 2:
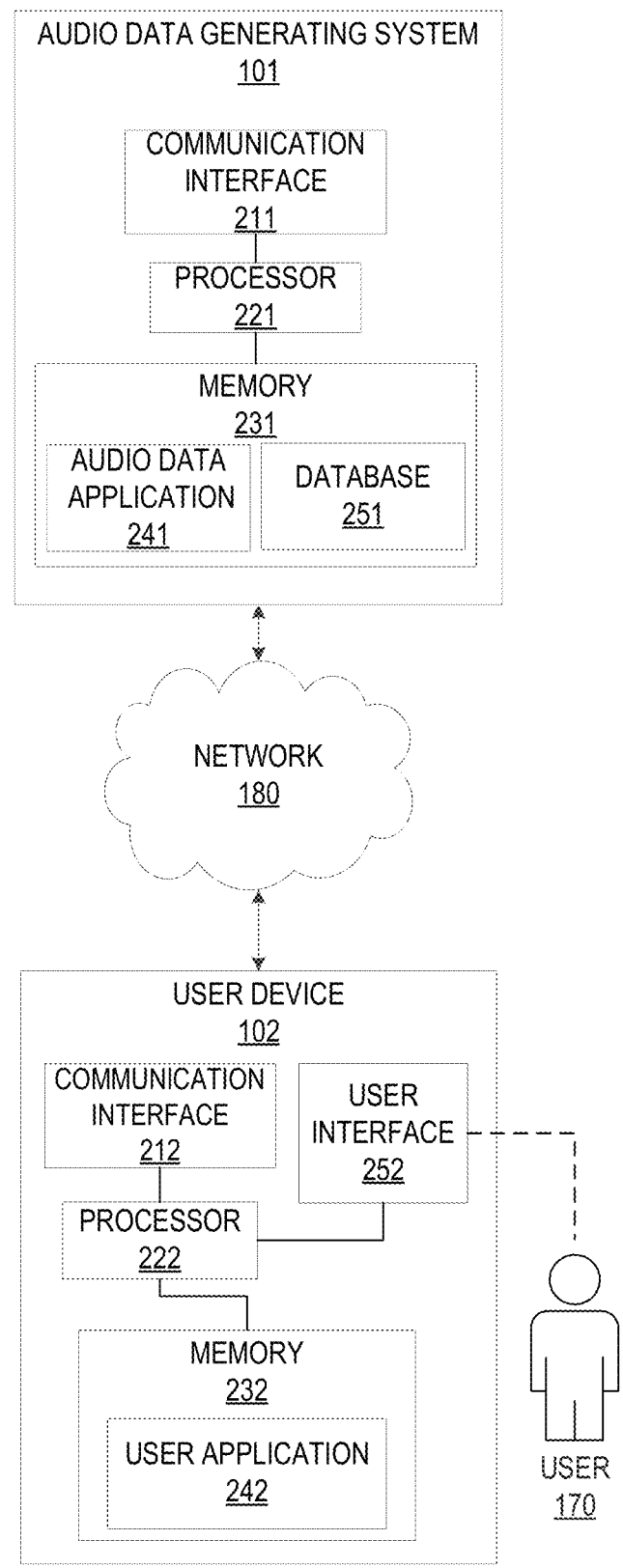
Figure 3:
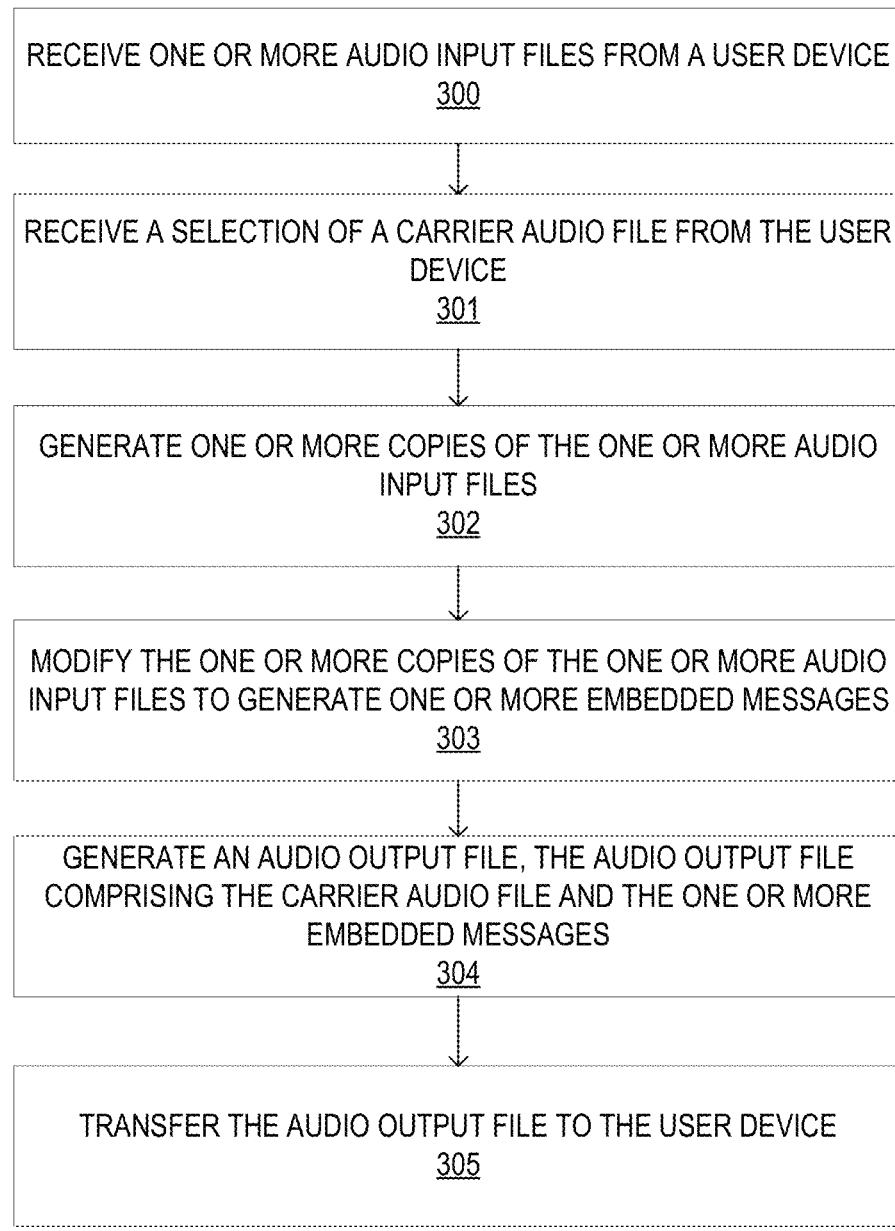

Having thus described embodiments of the invention in general terms, reference will now be made to the accompanying drawings, wherein:

FIG. 1 depicts an operating environment, in accordance with one embodiment of the present invention;

FIG. 2 depicts a block diagram illustrating the computing systems within the operating environment in more detail, in accordance with one embodiment of the present invention;

FIG. 3 depicts a process flow for generating an audio data file, in accordance with one embodiment of the present invention; and FIG. 4 depicts a graph illustrating sound intensity levels of the various audio tracks within the audio output file over time elapsed, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the system for generating audio data is implemented. The entity may be a business organization, a non-profit organization, a government organization, and the like.

"User" as used herein may refer to an individual who is the intended recipient of the audio data generated by the system. Typically, the user is a client or customer of the entity. The user may provide input data to the system, where the input data is utilized by the system to generate the audio data on behalf of the user. In some embodiments, the input data provided by the user is associated with an objective of the user.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

Embodiments of the present invention provide a system, computer program product, and method for generating audio data with embedded messages. In particular, the system utilizes audio input data provided by the user to generate the audio output data. Typically, the audio input data comprises vocal messages, recorded by the user's own voice, which relate to a particular objective of the user. The user may provide the audio input data to the system over a network using variety of methods, including, but not limited to, file transfer protocols, E-mail, MMS, P2P transfers, and the like. In some embodiments, the entity may provide a client application to the user for installation on the user's personal computing device, where the client application executes the processes necessary to allow the user device to record the audio input file, upload the audio input file to the audio data generating system, and receive and/or play the completed audio output file. In other embodiments, the user may utilize a computing system located on the premises of the entity to record the audio input data. The audio input data may further comprise carrier audio data, which is selected or provided by the user to be included in the final output audio data. Upon receiving the audio input data, the system may make modifications to the audio input data based on the user's objectives and intended use. For instance, the system may modify the characteristics of the vocal messages within the audio input data, such as frequency, intensity, playback speed, and the like. The system may further create a plurality of duplicates of the vocal messages within the audio input data to create a plurality of variations of the vocal messages to be included in the final audio output. In this way, the vocal messages may be played thousands of times in various forms within a single audio file. By combining the various audio tracks into a single recording, the system generates an audio output file that is compatible with the user's computing device, which may be provided to the user via the various file transfer methods and/or protocols as described herein. In some embodiments, the system's processes (e.g. generation of the audio data output file) may be conducted on a computing system that is separate from the user device that plays the audio data output file. In some embodiments, the system's processes as well as the playback may be accomplished on the individual user device. In such embodiments, the user device itself may modify the audio input data to generate the audio output data files.

In some embodiments, the audio output data file may comprise only the modified audio input data, which contains the user-provided subliminal messages in various forms. In such embodiments, the carrier audio not included in the final audio output data file. Rather, the carrier audio data and the modified audio input data may be stored separately on the user device and/or an external server. Through the user application, the user may be able to select a carrier audio file and one or more modified audio input data files to be played by the user device. In this way, the user may utilize the one or more modified audio input data files with a plurality of different carrier audio data files on an on-demand basis according to the user's needs and/or preferences.

The system provides a novel way to generate customized audio files via user-inputted data. In particular, the system generates a shorter, smaller audio file having equal or better effectiveness compared to traditional media containing embedded messages. In some embodiments, the embedded messages may be subliminal messages. For example, by varying the playback speed, pitch, and volume of the subliminal messages, said subliminal messages may be included thousands of times within a single five-minute audio file. This drastically increases the efficacy of the subliminal messages on the listener compared to traditional methods of embedding subliminal messages, which typically uses subliminal messages played back at their native frequencies and speeds. Furthermore, by producing an audio file with a high efficacy to file size ratio, the system is able to utilize much smaller amounts of digital storage, which in turn places a smaller stress on the computing resources of the system that produces the audio files as well as the device which plays back the audio files. Said computing resources may include, but are not limited to, processing power, memory space, storage space, cache space, electric power, and networking bandwidth.

FIG. 1 is a block diagram illustrating an operating environment, in accordance with one embodiment of the present invention. In particular, the operating environment may comprise an audio data generating system 101 in operative communication with a user device 102 over a network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180. The audio data generating system 101 may be a stationary computing device such as a server, desktop computer, or terminal within the entity's premises, or it may be a portable device such as a laptop, tablet, smartphone, single board computer, smart device, and the like. Typically, the audio data generating system 101 comprises the hardware and software necessary to receive audio inputs from the user, combine variations of the user-provided audio input and the carrier audio data, and produce a playable sound file. The user device 102 may be a mobile device such as a smartphone, tablet, or laptop, a personal computing device such as a desktop computer, smart device, single board computer, or a device owned and operated by an entity, such as a computer system terminal located on the entity's premises. Typically, the user device 102 comprises the hardware and software necessary to record audio inputs from the user 170, send audio inputs to the audio data generating system 101 over the network 180, and play the audio file generated by the system. It should be understood by those of ordinary skill in the art that the various devices and computing systems as depicted herein may be embodied in a single device or computing system, or in multiple devices and/or computing systems in a distributed manner. Accordingly, in certain embodiments, the user device 102 may be configured to execute the functions and/or processes of the audio data generating system 101.

Typically, the user 170 initiates the subliminal audio data generation process by recording the user's 170 voice through an audio input device within the user device 102. The audio input device may be, for example, a microphone or similar device which allows for the creation of a digital audio recording. In some embodiments, the user 170 may use pre-existing audio recording software on the user device 102. In other embodiments, the entity may provide a user application which may control all aspects of the subliminal audio data generation process, including the recording step. Typically, the user 170 records his or her own voice while making an affirmative or suggestive statement. In some embodiments, the affirmative statement may relate to a life goal or objective of the user 170. For example, the user 170 may wish to improve an aspect of his or her life, such as the level of motivation in the mornings. To this effect, the user 170 may record one or more instances in which the user 170 makes one or more affirmative statements that relate to the user's 170 motivation. The one or more audio input files may be recorded in various bitrates and file formats according to the capabilities of the user device 102, which may include .wav, .mp3, .wma, .ogg, .flac, and the like.

Once the recording process is complete, the user 170 may, through the user device 102, upload the one or more audio input files to the audio data generating system 101 over the network 180 for further processing. In some embodiments, the audio input file may be sent to the audio data generating system 101 via e-mail, MMS, file transfer protocols, P2P transfers, and the like. In some embodiments, a user application may control the file transfer to the audio data generating system 101. Typically, the user 170 will simultaneously upload a carrier audio file, which serves as the background to the generated audio output file. In some embodiments, the carrier audio file may contain a song or musical piece. In some embodiments, the carrier audio file may contain non-musical sounds, such as the sounds of white noise, ocean waves, rainfall, crickets, spoken words, and the like. In some embodiments, the user application may also send technical data about the hardware of the user device 102. For example, the technical data may include the number of speakers, file types supported, memory space, processing power, operating systems, and the like. The user application may further allow the user to specify an intended use of the audio output file, which may change the parameters of the audio output file. For instance, depending on whether the user wishes to listen to the audio output file in the mornings after waking up or while falling asleep at night, the audio data generating system 101 may adjust the length of the audio output file according to the intended purpose.

Upon receiving the carrier audio file and the audio input file, the audio data generating system 101 begins the process of generating the subliminal audio data output file. The audio data generating system 101 may first detect the sound intensity levels of the carrier audio file. Typically, the sound intensity level of the carrier audio file will be within normal listening levels. As used herein, "normal listening levels" may indicate a sound intensity level ranging from 30 dB to 100 dB. Next, the system may generate a plurality of copies of the one or more audio input files to be incorporated into the final audio output file. The system may further cut the one or more audio input files into discrete segments and transform each segment before incorporating them into the output file. For example, the sound intensity levels of each segment are typically adjusted such that the segments are played back in the range of 0 dB to 30 dB when the carrier audio file is played back at normal listening levels. In such embodiments, the segments, which contain affirmations made in the user's 170 own voice, are typically detectable by the user 170 but not consciously discernable. In other words, while the user's 170 conscious mind may not be able to understand the messages within the segments, the user's 170 unconscious mind is able to detect and decipher the messages. In some embodiments, each segment may be further be adjusted for frequency. As a result, some segments included may be played back at a normal pitch, while other segments may be played back at higher or lower pitches. Typically, the frequency of each segments falls within the human hearing range of 20 Hz to 20,000 Hz. In some embodiments, each segment may be adjusted for playback speed. As a result, some segments included may be played back at a native speed, while other segments may be played back at a lower or higher playback speed. In some embodiments, certain segments may be selected to play on different audio channels based on the playback capabilities of the user device 102. Once the segments have been modified, the segments along with the carrier audio file may be arranged by the system on a plurality of tracks within the audio output file such that the segments may be played sequentially and/or in parallel with each other throughout the length of the carrier audio file. By embedding subliminal messages in this manner, the system is able to produce an audio file having a number of subliminal repetitions that is orders of magnitude greater than those of traditional subliminal message sound files. Accordingly, the system greatly increases the effectiveness of subliminal message files per time spent listening by the user 170.

Once the carrier audio file and segments of the audio input file are combined, the audio data generating system 101 may generate a master from which the final output file is to be generated. Typically, the audio data generating system 101 generates a final audio file according to the specifications and/or capabilities of the hardware of the user device 102. For instance, the system may generate a mono sound file if the user device 102 has a single piece speaker. In some embodiments, the system may generate separate audio output files to be compatible with a plurality of different user devices 102. In some embodiments, the system may generate the audio output file in a file format supported by the user device 102, such as .mp3. Once the audio output file is generated, the audio data generating system 101 may transfer the audio output file to the user device 102. In some embodiments, the audio output file may be sent by E-mail, file transfer, MMS, and the like. In some embodiments, the audio output file may be securely stored within the audio data generating system 101 for a length of time to allow the user device 102 to download the audio output file via the user application. Once the audio output file has been transferred to the user device 102, the user 170 may play back the audio output file according to the user's 170 intended use.

FIG. 2 is a block diagram illustrating the computing systems within the operating environment in more detail, in accordance with one embodiment of the present invention. In particular, the operating environment may include an audio data generating system 101 in operative communication with a user device 102 over a network 180. The audio data generating system 101 typically includes a processor 221 operatively connected to a communication interface 211 and the memory 231. The processor 221, and other processors described herein, typically includes circuitry for implementing communication and/or logic functions of the various computing systems, including the audio data generating system 101. For example, the processor 221 may include a digital signal processor device, a microprocessor device, and various analog to digital converters, digital to analog converters, and/or other support circuits. The audio data generating system 101 may use the communication interface 211 to communicate with other devices over the network 180. The communication interface 211 as used herein may include an Ethernet interface, an antenna coupled to a transceiver configured to operate on a cellular data or WiFi signal, and/or a near field communication ("NFC") interface.

The audio data generating system 101 may include a memory 231 operatively coupled to the processor 221. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. An audio data application 241 may be stored within the memory 231 of the audio data generating system 101. The audio data application 241 typically contains program code to modify the audio input files and carrier audio data and generate the audio output file. The audio data application 241 may further be configured coordinate the sending and receiving of audio data files both to and from the user device 102.

The user device 102 may comprise a processor 222 operatively connected to a communication interface 212 and a memory 232. Typically, the user device 102 is a personal device of the user 170, such as a smart device, tablet, smartphone, laptop, desktop computer, single board computer, and the like. A user application 242 may be stored within the memory 232 of the user device 102. The user device 102 may further comprise a user interface 252 to accept inputs from the user 170 and provide outputs to the user 170. For instance, the user interface 252 may include a display through which the user device 102 provides the user 170 with information, such as a screen, monitor, projector, and the like. The user interface 252 may further include a device to provide audio output, such as speakers, tweeters, subwoofers, and/or various output ports, such as analog audio output jacks, digital output jacks such as HDMI, and the like. The user interface 252 may further comprise one or more input devices, such as keyboards, keypads, touchscreens, video and/or image cameras, microphones, and the like.

In some embodiments, the user application 242 may comprise standard software to record audio input files and transfer them to the audio data generating system 101. In some embodiments, the user application 242 may be a proprietary application provided to the user 170 by an entity that owns and/or operations the audio data generating system 101. Typically, the user 170 records his or her own voice through the microphone within the user interface 252 and the user application 242. The user 170 may also select a carrier audio file through the user application 242 in addition to user 170 preferences or an intended use of the final audio output file. The user device 102 may then send the data through the communication interface 212 to the audio data generating system 101 to generate the audio output file as described herein.

In some embodiments, the memory 231 may further comprise a database 251 which stores data associated with a user and/or a user device. For instance, the database 251 may contain information on the user's preferences (e.g. file type, size, and other technical requirements) and/or intended use. The database 251 may further comprise various carrier audio files which may be selected by the user if the user does not provide a carrier audio file to the system.

FIG. 3 illustrates a process flow for generating an audio data file, in accordance with one embodiment of the present invention. The process begins at block 300, where the system receives one or more audio input files from a user device. Typically, the one or more audio input files comprise audio data of the voice of a user associated with the user device. The one or more audio input files may contain spoken affirmations in the user's voice which relate to an objective of the user. For instance, it may be the objective of the user to adopt a more optimistic mindset. To this end, the user may record one or more spoken affirmations relating to this objective. Typically, the recording is accomplished via an audio input device within the user device, such as a microphone. The audio input files may be temporarily stored on the user device to be transferred to the system at a later time. In other embodiments, the user application stored on the user device may stream the audio data from the user's spoken affirmations in real time to the system. The user device may be configured to send the audio input files to the system over the network using various file transfer methods as described herein.

The process continues to block 301, where the system receives a selection of a carrier audio file from the user device. Typically, the carrier audio file serves as the backdrop to be included in the audio output file. The carrier audio file is generally played at native speeds and volumes when incorporated into the audio output file. Accordingly, the length and/or size of the audio output file may at least in part be determined by the characteristics (e.g. bitrate, length, frequencies, etc.) of the carrier audio fie. In some embodiments, the carrier audio file may include musical sounds such as songs. In some embodiments, the carrier audio file may include non-musical sounds such as sounds of nature, spoken words, white noise, and the like. In some embodiments, the carrier audio file may be provided by the user through the user device. In such embodiments, the user application may require the user to confirm that the user possesses the license to utilize the carrier audio file. The user device may then be authorized to send the carrier audio file to the system over the network using the various file transfer methods as described herein. In other embodiments, the user may be able to select from a preset list of carrier audio files stored within the entity's systems.

The process continues to block 302, where the system generates one or more copies of the one or more audio input files. Typically, the system will create a plurality of copies of each audio input file provided for inclusion in the final audio output. In some embodiments, the system may generate thousands of copies of the audio input file. The copies may be generated and stored temporarily within the memory of the audio data generating system in advance of the audio output file generating process. In other embodiments, the audio data application may be scripted to generate said copies on an as-needed, real-time basis while generating the audio output file. In this way, the system is able to reduce the storage requirements of pre-generating the copies and storing them before generation of the final audio output file. In some embodiments, the system may segment the audio files based on the number of discrete messages within each audio file. For instance, if the user records one large audio file comprising six messages, the system may detect that the audio file comprises six messages and create six segments accordingly.

The process continues to block 303, where the system modifies the one or more copies of the one or more audio input files to generate one or more embedded messages. Typically, the system will generate the subliminal messages by lowering the sound intensity level of the one or more copies of the one or more audio input files. The system may first detect the sound intensity level of the carrier audio file to establish a base sound intensity level. Upon establishing the base sound intensity level, the system may adjust the sound intensity level of the copies of the audio input files such that when the carrier audio file is played back at normal listening levels of 30-100 dB, the copies of the audio input files will be played back at 0-30 dB. In this way, the copies of the audio input files may be detectable by the user's conscious mind, but the user will not typically be able to discern the words spoken or comprehend the messages on a conscious level. On the other hand, because the messages become detectable by the ear and the subconscious mind, the user may nevertheless obtain the benefit of the spoken affirmations on a subconscious level.

The system may further generate subliminal messages by modifying the characteristics of the copies of the audio input files, such as the frequency profile, playback speed, and the like. As a result, some messages may be played back at a greatly increased speed such that the message may be included multiple times per second, while other messages may be played back at greatly reduced speeds such that the message may span over a minute. Furthermore, some messages may be modified such that the pitch may be higher or lower than the native pitch of the message. In some embodiments, while the pitch of the messages may remain within the human hearing range of 20 Hz to 20 kHz, the system may adjust the pitch of certain messages to fall close to the outside range (e.g. close to 20 Hz or 20 kHz). In this way, the ear and subconscious mind may be able to detect the message even if the conscious mind fails to notice it. In some embodiments, some of the messages may be played back at a native frequency and/or speed. In this way, the system generates multiple iterations of the subliminal messages that can vary in intensity, pitch, and speed, which may be included in the final audio output file. In other words, the system is able to include many more iterations and variations of the subliminal messages into a single audio file compared to traditional systems and methods for creating subliminal messages. In some embodiments, certain messages may be configured to be played back on particular channels but not the others, while other messages may be configured to be played on all channels.

The process continues to block 304, where the system generates an audio output file, the audio output file comprising the carrier audio file and the one or more embedded messages. The system may generate a multi-track audio file that combines the carrier audio file and the various subliminal messages, where the carrier audio file and each subliminal message is placed on a separate track. The multi-track audio file may be generated such that when the audio file is played back by the user, the user is only able to consciously perceive the carrier audio file while simultaneously receiving the subliminal messages on a subconscious level. Some of the subliminal messages may be included in the audio file in a serial mode (i.e. played back one after the other), while other subliminal messages may be included in a parallel mode (i.e. played back simultaneously). In some embodiments, the audio output file may be generated for compatibility with one or more user devices. For instance, the audio output file may be generated in the .mp3 file format such that it remains compatible with most or all of the user's various devices while reducing file size. In some embodiments, the audio output file may be generated according to user preferences. For example, the user may prioritize audio fidelity over compatibility or storage space, which may trigger the system to generate an audio output file in a lossless file format, such as .flac.

Finally, the process concludes at block 305, where the system transfers the audio output file to the user device. Typically, the system sends the completed audio output file to the user device over a network. Accordingly, the audio output file may be sent as an attachment to an e-mail, direct message, or text message, uploaded to the user device via a file transfer and/or P2P protocol, or provided to the user via an audio stream. In some embodiments, the system may be configured to automatically push the audio file to the user device via the user application. In other embodiments, the system may temporarily store the audio file and make the audio file available for download to the user device. In such embodiments, the system may be configured to send a hyperlink to the user device through the various communication methods as described herein. In some embodiments, the system may trigger a notification within the user application on the user device which alerts the user that the audio output file is available for download. The notification may further comprise a link that, when selected, allows the user device to download the completed audio output file from the system.

FIG. 4 depicts a graph illustrating sound intensity levels of the various audio tracks within the audio output file over time elapsed, in accordance with one embodiment of the present invention. In particular, the graph comprises a region representing audio input data levels 400 and a region representing carrier audio data levels 401. Typically, under normal audio file playback conditions, the carrier audio data levels 401 range from 30 dB to 130 dB. The audio input data is typically modified such that its sound intensity levels are adjusted relative to the carrier audio data levels 401. In this way, the sound intensity levels of the audio input data fall within the audio input data levels 400, which typically range from 10 dB to 30 dB when the audio output data file is played.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating an audio data file, comprising:
    a processor;
    a communication interface; and
    a memory having an audio data application stored therein, wherein the audio data application, when executed by the processor, causes the processor to:
        receive an audio input file from a user device, wherein the audio input file comprises a recording of a voice of a user;
        receive a selection of a carrier audio file from the user device;
        generate a plurality of copies of the audio input file;
        modify the plurality of copies of the audio input file to generate a plurality of embedded messages;
        generate an audio output file, the audio output file comprising the carrier audio file and the plurality of embedded messages; and
        transfer the audio output file to the user device.

2. The system according to claim 1, wherein modifying the plurality of copies of the audio input file comprises:
    detecting a base sound intensity level of the carrier audio file; and
    reducing sound intensity levels of the plurality of copies of the audio input file based on the base sound intensity level.

3. The system according to claim 2, wherein the base sound intensity level is between 30 dB and 100 dB, wherein the sound intensity levels of the plurality of copies of the audio input file are between 0 dB and 30 dB.

4. The system according to claim 1, wherein modifying the plurality of copies of the audio input file comprises:
   reducing a frequency of a first copy of the audio input file; and
   increasing a frequency of a second copy of the audio input file.

5. The system according to claim 4, wherein the frequency of the first copy of the audio input file and the frequency of the second copy of the audio input file are both between 20 Hz and 20 kHz.

6. The system according to claim 1, wherein modifying the plurality of copies of the audio input file comprises:
   reducing a playback speed of a first copy of the audio input file; and
   increasing a playback speed of a second copy of the audio input file.

7. A computer program product for generating an audio data file, the computer program product comprising at least one non-transitory computer readable medium having computer-readable program code portions embodied therein, the computer-readable program code portions comprising:
   an executable portion for receiving an audio input file from a user device, wherein the audio input file comprises a recording of a voice of a user;
   an executable portion for receiving a selection of a carrier audio file from the user device;
   an executable portion for generating a plurality of copies of the audio input file;
   an executable portion for modifying the plurality of copies of the audio input file to generate a plurality of embedded messages;
   an executable portion for generating an audio output file, the audio output file comprising the carrier audio file and the plurality of embedded messages; and
   an executable portion for transferring the audio output file to the user device.

8. The computer program product according to claim 7, wherein modifying the plurality of copies of the audio input file comprises:
   detecting a base sound intensity level of the carrier audio file; and
   reducing sound intensity levels of the plurality of copies of the audio input file based on the base sound intensity level.

9. The computer program product according to claim 8, wherein the base sound intensity level is between 30 dB and 100 dB, wherein the sound intensity levels of the plurality of copies of the audio input file are between 0 dB and 30 dB.

10. The computer program product according to claim 7, wherein modifying the plurality of copies of the audio input file comprises:
    reducing a frequency of a first copy of the one or more audio input files; and
    increasing a frequency of a second copy of the one or more audio input files.

11. The computer program product according to claim 10, wherein the frequency of the first copy of the audio input file and the frequency of the second copy of the audio input file are both between 20 Hz and 20 kHz.

12. The computer program product according to claim 7, wherein modifying the plurality of copies of the audio input file comprises:
    reducing a playback speed of a first copy of the audio input file; and
    increasing a playback speed of a second copy of the audio input file.

13. A computer-implemented method for generating an audio data file, said method comprising:
    receiving an audio input file from a user device, wherein the audio input file comprises a recording of a voice of a user;
    receiving a selection of a carrier audio file from the user device;
    generating a plurality of copies of the audio input file;
    modifying the plurality of copies of the audio input file to generate a plurality of embedded messages;
    generating an audio output file, the audio output file comprising the carrier audio file and the plurality of embedded messages; and
    transferring the audio output file to the user device.

14. The computer-implemented method according to claim 13, the method further comprising:
    detecting a base sound intensity level of the carrier audio file; and
    reducing sound intensity levels of the plurality of copies of the audio input file based on the base sound intensity level.

15. The computer-implemented method according to claim 14, wherein the base sound intensity level is between 30 dB and 100 dB, wherein the sound intensity levels of the plurality of copies of the audio input file are between 0 dB and 30 dB.

16. The computer-implemented method according to claim 13, wherein modifying the plurality of copies of the audio input file comprises:
    reducing a frequency of a first copy of the audio input file; and
    increasing a frequency of a second copy of the audio input file.

17. The computer-implemented method according to claim 16, wherein the frequency of the first copy of the audio input file and the frequency of the second copy of the audio input file are both between 20 Hz and 20 kHz.

18. The computer-implemented method according to claim 13, wherein modifying the plurality of copies of the audio input file comprises:
    reducing a playback speed of a first copy of the audio input file; and
    increasing a playback speed of a second copy of the audio input file.

* * * * *